(12) United States Patent
Wang et al.

(10) Patent No.: US 11,560,324 B2
(45) Date of Patent: Jan. 24, 2023

(54) METHOD FOR REMOVING HEAVY METAL POLLUTANTS IN WATER WITH DIVALENT MANGANESE STRENGTHENED FERRATE

(71) Applicant: Harbin Institute of Technology, Harbin (CN)

(72) Inventors: Lu Wang, Harbin (CN); Jun Ma, Harbin (CN); Yulei Liu, Harbin (CN)

(*) Notice: Subject to any disclaimer, the term of this patent is extended or adjusted under 35 U.S.C. 154(b) by 189 days.

(21) Appl. No.: 17/054,456

(22) PCT Filed: Jul. 16, 2018

(86) PCT No.: PCT/CN2018/095812
§ 371 (c)(1),
(2) Date: Nov. 10, 2020

(87) PCT Pub. No.: WO2019/214065
PCT Pub. Date: Nov. 14, 2019

(65) Prior Publication Data
US 2021/0230029 A1    Jul. 29, 2021

(30) Foreign Application Priority Data

May 11, 2018 (CN) .......................... 201810448789.5

(51) Int. Cl.
| | |
|---|---|
| *C02F 1/72* | (2006.01) |
| *C02F 1/28* | (2006.01) |
| *C02F 1/52* | (2006.01) |
| *C02F 1/62* | (2006.01) |
| C02F 101/20 | (2006.01) |
| C02F 101/22 | (2006.01) |
| C02F 103/06 | (2006.01) |
| C02F 1/56 | (2006.01) |

(52) U.S. Cl.
CPC ............... *C02F 1/72* (2013.01); *C02F 1/281* (2013.01); *C02F 1/288* (2013.01); *C02F 1/5245* (2013.01); *C02F 1/62* (2013.01); *C02F 2101/203* (2013.01); *C02F 2101/22* (2013.01); *C02F 2103/06* (2013.01); *C02F 2209/44* (2013.01); *C02F 2305/02* (2013.01)

(58) Field of Classification Search
None
See application file for complete search history.

(56) References Cited

FOREIGN PATENT DOCUMENTS

| CN | 1502710 A | * | 6/2004 |
|---|---|---|---|
| CN | 102145947 A | * | 8/2011 |

OTHER PUBLICATIONS

Machine translation of CN 1502710A, pp. 1-7. (Year: 2004).*
Machine translation of CN 102145947A, pp. 1-6. (Year: 2011).*

* cited by examiner

*Primary Examiner* — Clare M Perrin
(74) *Attorney, Agent, or Firm* — Novoclaims Patent Services LLC; Mei Lin Wong

(57) ABSTRACT

In order to solve the problem in the existing conventional water treatment process of low removal efficiency of heavy metal in water, especially lower efficiency for simultaneous removal of heavy metal pollutants during coexisting, a method is provided for removing heavy metal pollutants in water with divalent manganese strengthened ferrate: preparing a ferrate mother liquor having the concentration of 20-10,000 mmol/L; preparing a divalent manganese salt mother liquor having the concentration of 30-10,000 mmol/L; adding the divalent manganese salt mother liquor into water of the heavy metal pollutants; then adding the ferrate mother liquor, and reacting; and then adding a flocculant and precipitating, so that the removal rate of arsenate, chromium, thallium, antimony, chromium and molybdate in water is 90% or more, and the removal rate of heavy metal such as lead and cadmium is 85% or more.

10 Claims, No Drawings

METHOD FOR REMOVING HEAVY METAL POLLUTANTS IN WATER WITH DIVALENT MANGANESE STRENGTHENED FERRATE

FIELD OF INVENTION

The present invention relates to a method of removing a variety of heavy metal pollutants in water by divalent manganese-enhanced ferrate.

DESCRIPTION OF RELATED ARTS

Heavy metals are a type of important pollutants that are more harmful to human body. They can accumulate easily in organisms, their toxicity varies with their forms, and they cannot be eliminated by biodegradation. These characteristics make their pollution problem particularly prominent. Heavy metal pollution in water bodies is mainly caused by the industrial wastewater, such as electroplating wastewater, pigment wastewater, electronic industrial wastewater, alloy wastewater, mining wastewater, etc. discharged into the water bodies. The presence of heavy metals in water seriously affects people's health. There is a large amount of information indicating that shows that certain inorganic or mineral components in drinking water are related to certain diseases. Heavy metal ions such as cadmium, copper and zinc have a causal relationship with cardiovascular disease. Lead is also a toxic substance, and people drinking water with lead content above 0.03 mg/L can lead to chronic poisoning. Lead can have a synergistic effect with other metals and increase the toxicity of other metals. Heavy metal pollution has become more serious and has caused many poisoning incidents. In the mid-20th century, "Minamata disease" occurred due to mercury pollution in the coastal areas of Minamata Bay in Yumoto Prefecture, Japan. Itai-itai disease occurred in cadmium-polluted areas in the Jinzu Basin of Toyama Prefecture, resulting in tens of deaths and hundreds to tens of thousands of victims. How to effectively remove heavy metal pollutants from drinking water sources has become an urgent problem to be solved in water treatment.

SUMMARY OF THE PRESENT INVENTION

Technical Problems

In order to solve the problem of low removal efficiency of heavy metals in water by the existing conventional water treatment processes, especially the even lower simultaneous removal efficiency when multiple heavy metal pollutants coexist, the present invention provides a method of removing multiple heavy metal pollutants in water by divalent manganese-enhanced ferrate.

Solutions to the Technical Problems

The method of removing multiple heavy metal pollutants in water by divalent manganese-enhanced ferrate according to the present invention is carried out according to the following steps:
1. Prepare ferrate stock solution with a concentration of 20-10,000 mmol/L; 2. Prepare divalent manganese salt stock solution with a concentration of 30-10,000 mmol/L; 3. Add the divalent manganese salt stock solution prepared in step 2 to a water body containing one or more heavy metal pollutants, where a final concentration of the divalent manganese is 5-20 µmol/L; 4. Add the ferrate stock solution prepared in step 1 to the water body in step 3 and allow reaction for 1-60 min; then add flocculant; then stir for 0.8-1.2 min at 100-130 r/min, then stir for 15-25 min at 30-50 r/min, and allow precipitation for 15-25 min, which is completed, wherein a molar ratio of bivalent manganese to ferrate is 0.1-1.5:1.

Ferrate is a strong oxidant and has strong oxidizing properties in the entire pH range. It is 0.7 V under alkaline conditions; 2.2 V under acidic conditions. Many researchers have determined that ferrate will not be directly converted from Fe(VI) to Fe(III) during decomposition, but will undergo intermediate oxidation states such as $Fe^{+5}$ and $Fe^{+4}$, and may form hydrolysis products with a larger network structure and higher positive charge than the hydrolysis products of aluminum and iron salt. The formation of a variety of hydrolysis products indicates that ferrate may neutralize the (zeta) potential of colloids in water more effectively than inorganic flocculants. They will polymerize in water and eventually form ferric hydroxide colloidal precipitates.

Advantageous Effect of the Present Invention

Advantageous Effect

The present invention provides a method of efficiently and simultaneously removing multiple heavy metal pollutants in water by divalent manganese-enhanced ferrate. According to the present invention, the rapid reaction of bivalent manganese and potassium ferrate is used to simultaneously produce two nano-scale adsorbents with strong adsorption performance: manganese dioxide and ferric oxide. The produced nano-scale manganese dioxide particles have a large specific surface area, a strong negative charge on the surface, and a strong adsorption performance and removal effect on heavy metals such as lead, cadmium, thallium, and manganese; while the nano-scale iron oxide particles produced by this system also have a larger specific surface area, but the surface charge is weaker and they are easy to complex with oxyacid heavy metal pollutants, so it has a strong removal effect on heavy metal pollutants such as arsenate and molybdate. Therefore, the synergistic process of divalent manganese and potassium ferrate can efficiently and quickly remove multiple coexisting heavy metal pollutants in water at the same time. According to the type and concentration of heavy metal pollutants in the water, the input ratio of potassium ferrate and manganese ions can be flexibly adjusted, and the zeta potential on the surface of the new ecological nano-scale iron manganese oxide particles can be adjusted to so as to realize the efficient removal of heavy metal pollutants with different electrical properties. Since potassium ferrate itself is a water treatment agent that integrates multiple functions such as oxidation, disinfection, adsorption, and coagulation, the quantity of divalent manganese being added can be reduced and the quantity of potassium ferrate being added can be increased when the content of organic pollutants in the water body is relatively high, and the content of heavy metals is not high; and the quantity of divalent manganese being added can be increased when the content of organic pollutants in the water body is relatively low, and the content of heavy metals is relatively high. In addition, potassium ferrate can effectively adsorb the nano-manganese dioxide produced, reducing the possibility of manganese pollution in the water body. Divalent manganese synergizes with potassium ferrate to remove heavy metals from water has the advantages of low dosage, fast reaction, and low operating cost. The cost of ferrate is relatively high, but the cost of divalent manganese is low. Through this method, the purpose of efficiently removing heavy metal pollutants in water can be achieved at a lower cost. According to the present invention, the removal rate of arsenate, chromium, thallium, antimony, chromium and molybdate in the water body can reach more than 90%, and the removal rate of heavy metals such as lead and cadmium can reach more than 85%.

EMBODIMENT OF THE PRESENT INVENTION

Detailed Description of the Preferred Embodiment

Preferred embodiment 1: According to this embodiment, a method of removing multiple heavy metal pollutants in water by divalent manganese-enhanced ferrate is carried out according to the following steps:
1. Preparing ferrate stock solution with a concentration of 20-10,000 mmol/L; 2. Preparing divalent manganese salt stock solution with a concentration of 30-10,000 mmol/L; 3. Adding the divalent manganese salt stock solution prepared in step 2 to a water body which contains one or more heavy metal pollutants, where a final concentration of the divalent manganese is 5-20 μmol/L; 4. Adding the ferrate stock solution prepared in step 1 to the water body in step 3 and allowing reaction for 1-60 min; then adding flocculant; then stirring for 0.8-1.2 min at 100-130 r/min, then stirring for 15-25 min at 30-50 r/min, and allowing precipitation for 15-25 min, which is completed, wherein a molar ratio of bivalent manganese to ferrate is 0.1-1.5:1.

According to this embodiment, the heavy metal pollutants are one of or a mixture of more than one of arsenate, molybdate, chromium, lead, cadmium, thallium, antimony, iron, manganese and zinc in any ratio.

According to this embodiment, a method of simultaneously and efficiently removing multiple heavy metal pollutants in water by divalent manganese-enhanced ferrate according to the present invention is provided. According to this embodiment, the rapid reaction of bivalent manganese and potassium ferrate is used to simultaneously produce two nano-scale adsorbents with strong adsorption performance: manganese dioxide and ferric oxide. The produced nano-scale manganese dioxide particles have a large specific surface area and a strong negative charge on the surface, having a strong adsorption performance and removal effect on heavy metals such as lead, cadmium, thallium, and manganese; while the nano-scale iron oxide particles produced by this system also have a larger specific surface area, but the surface charge is weaker and they are easy to complex with oxyacid heavy metal pollutants, thus having a strong removal effect on heavy metal pollutants such as arsenate and molybdate. Therefore, the synergistic effect of divalent manganese and potassium ferrate can efficiently and quickly remove multiple coexisting heavy metal pollutants in water simultaneously. According to the type and concentration of heavy metal pollutants in the water, the ratio of potassium ferrate and manganese ions being added can be flexibly adjusted, and the zeta potential on the surface of the new ecological nano-scale iron manganese oxide particles can be adjusted so as to realize the efficient removal of heavy metal pollutants with different electrical properties. Since potassium ferrate itself is a water treatment agent that integrates multiple functions such as oxidation, disinfection, adsorption, and coagulation, the quantity of divalent manganese being added can be reduced and the quantity of potassium ferrate being added can be increased under the condition that the content of organic pollutants in the water body is relatively high, and the content of heavy metals is not high; and the quantity of divalent manganese being added can be increased under the condition that the content of organic pollutants in the water body is relatively low while the content of heavy metals is relatively high. In addition, potassium ferrate can effectively adsorb the nano-manganese dioxide produced, reducing the possibility of manganese pollution in the water body. Divalent manganese synergizes with potassium ferrate to remove heavy metals from water has the advantages of low dosage, fast reaction, and low operating cost. The cost of ferrate is relatively high, but the cost of divalent manganese is low. Through this method, the object of efficiently removing heavy metal pollutants in water can be achieved at a relatively lower cost. According to this embodiment, the removal rate of arsenate, chromium, thallium, antimony, chromium and molybdate in the water body can reach more than 90%, and the removal rate of heavy metals such as lead and cadmium can reach more than 85%.

Preferred embodiment 2: The difference between this embodiment and the embodiment 1 is that: in step 1, the ferrate is ferrate in solid form or ferrate in liquid form; wherein the ferrate is potassium ferrate, sodium ferrate or barium ferrate. Others are the same as the embodiment 1.

Preferred embodiment 3: The difference between this embodiment and the embodiment 1 or 2 is that: in step 2, the divalent manganese salt is one of or a mixture of a combination of manganese sulfate, manganese dichloride and manganese nitrate in any ratio. Others are the same as the embodiment 1 or 2.

Preferred embodiment 4: The difference between this embodiment and the embodiments 1 to 3 is that: in step 3, the flocculant is inorganic flocculant or organic flocculant. Others are the same as one of the embodiments 1 to 3.

According to this embodiment, the inorganic flocculant is aluminum salt or iron salt, such as aluminum sulfate, poly-aluminum, ferric chloride or ferrous sulfate; the organic flocculants are anionic, cationic or non-ionic, such as sodium polyacrylate, carboxymethyl cellulose (anionic), polyvinyl imine (cationic), polyethylene oxide, polyacrylamide (non-ionic).

Preferred embodiment 5: The difference between this embodiment and the embodiments 1 to 4 is that: in step 1, the ferrate stock solution being prepared has a concentration of 150 mmol/L. Others are the same as one of the embodiments 1 to 4.

Preferred embodiment 6: The difference between this embodiment and the embodiments 1 to 5 is that: in step 2, the divalent manganese salt stock solution being prepared has a concentration of 75 mmol/L. Others are the same as one of the embodiments 1 to 5.

Preferred embodiment 7: The difference between this embodiment and the embodiments 1 to 6 is that: in step 3, the final concentration of the divalent manganese is 7.5 μmol/L. Others are the same as one of the embodiments 1 to 6.

Preferred embodiment 8: The difference between this embodiment and the embodiments 1 to 7 is that: in step 4, adding the ferrate stock solution to the water body in step 3 and allowing reaction for 15 min, wherein a molar ratio of bivalent manganese to ferrate is 0.5:1. Others are the same as one of the embodiments 1 to 7.

Preferred embodiment 9: The difference between this embodiment and the embodiments 1 to 8 is that: in step 4, stirring for 1 min at 12 r/min, then stirring for 20 min at 40 r/min, and allowing precipitation for 20 min. Others are the same as one of the embodiments 1 to 8.

Preferred embodiment 10: The difference between this embodiment and the embodiments 1 to 9 is that: in step 4, a quantity of the flocculant being added is 0.3-200 per ton of water. Others are the same as one of the embodiments 1 to 9.

The advantageous effect of the present invention is verified by the exemplary embodiments as follows:

Exemplary Embodiment 1: The method of removing multiple heavy metal pollutants in water by divalent manganese-enhanced ferrate according to this embodiment is carried out according to the following steps: 1. Weigh potassium ferrate solid powder and use it to prepare ferrate stock solution with a concentration of 50 mmol/L; 2. Weigh manganese sulfate solid powder and use it to prepare divalent manganese salt stock solution with a concentration of 100 mmol/L; 3. Add the divalent manganese salt stock solution prepared in step 2 to a ground water body contaminated by arsenate and iron pollutants, where a final concentration of the divalent manganese is 5 $\mu$mol/L; 4. Add the ferrate stock solution prepared in step 1 to the water body in step 3 and allow reaction for 10 min; then add polyaluminum chloride at 60 g/ton water; then stir for 1 min at 120 r/min, then stir for 20 min at 40 r/min, and allow precipitation for 20 min, wherein a molar ratio of bivalent manganese to ferrate is 1:1. Filter the supernatant to determine the concentration of arsenate and iron remaining in the solution; the measurement result shows that in this embodiment, the removal rate of arsenate in the water body can reach more than 95%, and the removal rate of iron can reach more than 90%.

Exemplary Embodiment 2: The method of removing multiple heavy metal pollutants in water by divalent manganese-enhanced ferrate according to this embodiment is carried out according to the following steps: 1. Weigh potassium ferrate solid powder and use it to prepare ferrate stock solution with a concentration of 25 mmol/L; 2. Weigh manganese sulfate solid powder and use it to prepare divalent manganese salt stock solution with a concentration of 50 mmol/L; 3. Add the divalent manganese salt stock solution prepared in step 2 to a groundwater body contaminated by molybdate and antimony pollutants, where a final concentration of the divalent manganese is 7.5 $\mu$mol/L; 4. Add the ferrate stock solution prepared in step 1 to the water body in step 3 and allow reaction for 15 min; then add polyaluminum chloride at 50 g/ton water; then stir for 1 min at 120 r/min, then stir for 20 min at 40 r/min, and allow precipitation for 20 min, wherein a molar ratio of bivalent manganese to ferrate is 1.25:1. Filter the supernatant to determine the concentration of molybdate and antimony remaining in the solution; the measurement result shows that in this embodiment, the removal rate of molybdate in the water body can reach more than 94%, and the removal rate of antimony can reach more than 90%.

Exemplary Embodiment 3: The method of removing multiple heavy metal pollutants in water by divalent manganese-enhanced ferrate according to this embodiment is carried out according to the following steps: 1. Weigh potassium ferrate solid powder and use it to prepare ferrate stock solution with a concentration of 200 mmol/L; 2. Weigh manganese chloride solid powder and use it to prepare divalent manganese salt stock solution with a concentration of 100 mmol/L; 3. Add the divalent manganese salt stock solution prepared in step 2 to a surface water body contaminated by arsenate, lead and cadmium pollutants, where a final concentration of the divalent manganese is 10 $\mu$mol/L; 4. Add the ferrate stock solution prepared in step 1 to the water body in step 3 and allow reaction for 30 min; then add polyaluminum chloride at 80 mg/L; then stir for 1 min at 120 r/min, then stir for 20 min at 40 r/min, and allow precipitation for 20 min, wherein a molar ratio of bivalent manganese to ferrate is 1:1. Filter the supernatant to determine the concentration of arsenate, lead and cadmium remaining in the solution; the measurement result shows that in this embodiment, the removal rate of arsenate in the water body can reach more than 92%, and the removal rate of lead and cadmium can reach more than 90%.

Exemplary Embodiment 4: The method of removing multiple heavy metal pollutants in water by divalent manganese-enhanced ferrate according to this embodiment is carried out according to the following steps: 1. Weigh potassium ferrate solid powder and use it to prepare ferrate stock solution with a concentration of 150 mmol/L; 2. Weigh manganese sulfate solid powder and use it to prepare divalent manganese salt stock solution with a concentration of 75 mmol/L; 3. Add the divalent manganese salt stock solution prepared in step 2 to a surface water body contaminated by molybdate and thallium pollutants, where a final concentration of the divalent manganese is 7.5 $\mu$mol/L; 4. Add the ferrate stock solution prepared in step 1 to the water body in step 3 and allow reaction for 15 min; then add polyaluminum chloride at 75 g/ton water; then stir for 1 min at 120 r/min, then stir for 20 min at 40 r/min, and allow precipitation for 20 min, wherein a molar ratio of bivalent manganese to ferrate is 0.5:1. Filter the supernatant to determine the concentration of molybdate and thallium remaining in the solution; the measurement result shows that in this embodiment, the removal rate of molybdate in the water body can reach more than 95%, and the removal rate of thallium can reach more than 90%.

Exemplary Embodiment 5: The method of removing multiple heavy metal pollutants in water by divalent manganese-enhanced ferrate according to this embodiment is carried out according to the following steps: 1. Weigh potassium ferrate solid powder and use it to prepare ferrate stock solution with a concentration of 100 mmol/L; 2. Weigh manganese sulfate solid powder and use it to prepare divalent manganese salt stock solution with a concentration of 50 mmol/L; 3. Add the divalent manganese salt stock solution prepared in step 2 to a surface water body contaminated by chromium, lead and cadmium pollutants, where a final concentration of the divalent manganese is 6 $\mu$mol/L; 4. Add the ferrate stock solution prepared in step 1 to the water body in step 3 and allow reaction for 15 min; then add polyaluminum chloride at 70 g/ton water; then stir for 1 min at 120 r/min, then stir for 20 min at 40 r/min, and allow precipitation for 20 min, wherein a molar ratio of bivalent manganese to ferrate is 0.5:1. Filter the supernatant to determine the concentration of chromium, lead and cadmium remaining in the solution; the measurement result shows that in this embodiment, the removal rate of chromium in the water body can reach more than 94%, and the removal rate of lead and cadmium can reach more than 88%.

What is claimed is:

1. A method of removing one or more heavy metal pollutants in water by divalent manganese-enhanced ferrate, comprising the following steps:
(i) preparing ferrate stock solution with a concentration of 20-10,000 mmol/L; (ii) preparing divalent manganese salt stock solution with a concentration of 30-10,000 mmol/L; (iii) adding the divalent manganese salt stock solution prepared in step (ii) to a water body which comprises one or more heavy metal pollutants, where a final concentration of the divalent manganese in the water body is 5-20 $\mu$mol/L; (iv) after step (iii), adding the ferrate stock solution prepared in step (i) to the water body and reacting for 1-60 min; then adding flocculant; then stirring for 0.8-1.2 min at 100-130 r/min, then stirring for 15-25 min at 30-50 r/min, and allowing precipitation for 15-25 min, wherein a molar ratio of bivalent manganese to ferrate is 0.1-1.5:1 after the ferrate stock solution is added to the water body.

2. The method of removing one or more heavy metal pollutants in water by divalent manganese-enhanced ferrate according to claim 1, wherein in step (i), the ferrate stock solution is prepared from ferrate in solid form or ferrate in liquid form; wherein the ferrate is potassium ferrate, sodium ferrate or barium ferrate.

3. The method of removing one or more heavy metal pollutants in water by divalent manganese-enhanced ferrate according to claim 1, wherein in step (ii), the divalent manganese salt is one of or a mixture containing more than one of manganese sulfate, manganese dichloride and manganese nitrate in any ratio.

4. The method of removing one or more heavy metal pollutants in water by divalent manganese-enhanced ferrate according to claim 1, wherein in step (iii), the flocculant is inorganic flocculant or organic flocculant.

5. The method of removing one or more heavy metal pollutants in water by divalent manganese-enhanced ferrate according to claim 1, wherein in step (i), the ferrate stock solution has a concentration of 150 mmol/L.

6. The method of removing one or more heavy metal pollutants in water by divalent manganese-enhanced ferrate according to claim 1, wherein in step (ii), the divalent manganese salt stock solution has a concentration of 75 mmol/L.

7. The method of removing one or more heavy metal pollutants in water by divalent manganese-enhanced ferrate according to claim 1, wherein in step (iii), the final concentration of the divalent manganese is 7.5 μmol/L.

8. The method of removing one or more heavy metal pollutants in water by divalent manganese-enhanced ferrate according to claim 1, wherein in step (iv), adding the ferrate stock solution to the water body in step (iii) and allowing reaction for 15 min, wherein a molar ratio of bivalent manganese to ferrate is 0.5:1.

9. The method of removing one or more heavy metal pollutants in water by divalent manganese-enhanced ferrate according to claim 1, wherein in step (iv), after adding the flocculant, stirring for 1 min at 120 r/min, then stirring for 20 min at 40 r/min, and allowing precipitation for 20 min.

10. The method of removing one or more heavy metal pollutants in water by divalent manganese-enhanced ferrate according to claim 1, wherein in step (iv), a quantity of the flocculant being added is 0.3-200 g per ton of water.

* * * * *